US006680000B2

(12) United States Patent
Sasazawa et al.

(10) Patent No.: US 6,680,000 B2

(45) Date of Patent: Jan. 20, 2004

(54) POLYAMIDE PLASTIC MAGNETIC MATERIAL AND MAGNET MADE OF SAME

(75) Inventors: Takahiro Sasazawa, Iwata-gun (JP); Yoshimichi Sakama, Iwata-gun (JP)

(73) Assignee: Minebea Co., Ltd., Miyota-machi (JP)

( * ) Notice: Subject to any disclaimer, the term of this patent is extended or adjusted under 35 U.S.C. 154(b) by 15 days.

(21) Appl. No.: 10/191,456

(22) Filed: Jul. 10, 2002

(65) Prior Publication Data

US 2003/0034476 A1 Feb. 20, 2003

(30) Foreign Application Priority Data

Jul. 25, 2001 (JP) ....................................... 2001-224486

(51) Int. Cl.[7] ............................ H01F 3/08; C08G 67/00

(52) U.S. Cl. ................................ 252/62.54; 252/62.63; 252/62.55

(58) Field of Search ........................... 252/62.54, 62.55, 252/62.63

(56) References Cited

U.S. PATENT DOCUMENTS 5,091,268 A * 2/1992 Nishikawa et al. ... 428/694 BP

FOREIGN PATENT DOCUMENTS

| | | |
|---|---|---|
| JP | A 57-187910 | 11/1982 |
| JP | A 63-122106 | 5/1988 |
| JP | 1-270204 | * 10/1989 |

* cited by examiner

*Primary Examiner*—C. Melissa Koslow

(74) *Attorney, Agent, or Firm*—Oliff & Berridge, PLC

(57) ABSTRACT

A polyamide plastic magnetic material excellent in fluidity is provided, and a plastic magnet made of the same is highly flexible with no deterioration in strength and does not crack during fabrication. The polyamide plastic magnetic material consists of: magnetic powder; polyamide resin; and a predetermined amount of bis unsaturated fatty acid amide represented by the formula: $R_1$—CONH—$R_3$—NHCO—$R_2$ where $R_1$ and $R_2$ is an unsaturated hydrocarbon group having at least one double bond and $R_3$ is a hydrocarbon group. The three components are kneaded into a final magnetic material.

7 Claims, 2 Drawing Sheets

POLYAMIDE PLASTIC MAGNETIC MATERIAL AND MAGNET MADE OF SAME

BACKGROUND OF THE INVENTION

1. Field of the Invention

The present invention relates to a plastic magnetic material for insert molding to be used for motors and the like, particularly to a polyamide plastic magnetic material excellent in fluidity, and further to a plastic magnet made of the same, highly flexible with no deterioration in strength, and free from cracking due to shrinkage or thermal shock during a fabrication process.

2. Description of the Related Art

A plastic magnetic material can be used in insert molding, in which a motor shaft, for example, can inserted in a molding die. The insert molding is excellent in productivity and thus can reduce manufacturing cost of magnets. Also, the magnets made by the insert molding are excellent in dimensional precision, which expands the usage thereof. Meanwhile, an increasing amount of magnetic powder is used in a plastic magnetic material for a higher performance, and it is strongly demanded that a plastic magnetic material be more fluid and that a magnet made thereof be stronger and more flexible. A plastic magnet made of anisotropic magnet powder is produced in such a way that a molding process is conducted in a magnetic field so as to direct an axis of easy magnetization as desired in order to obtain a high performance. In this process, if the fluidity deteriorates, a magnet performance as expected cannot be realized.

The fluidity deteriorates because of melt viscosity of composition increasing due to increased content of magnetic powder in the plastic magnetic material. To overcome the problem, it has been proposed that lubricant such as metal soap be added to the plastic magnetic material.

The increased content of magnetic powder in the plastic magnetic material causes also deterioration in strength. Since the plastic magnet material has an expansion coefficient different from that of a metal to be insert molded, a plastic magnet suffering deterioration in strength is more liable to crack due to shrinkage at cooling or thermal shock during the molding process. The plastic magnet is required to be flexible so as to absorb difference in expansion coefficient between metallic magnetic powder and plastic resin but its flexibility deteriorates also due to the increased content of magnetic powder. To overcome the problem of deterioration in strength and flexibility of the plastic magnet, it is proposed to use a copolymer comprising polyamide and rubber as a plastic resin (Japanese Patent Laid-open No. Sho 57-187910), or to use polyamide elastomer containing a polyether group together with polyamide (Japanese Patent Laid-open No. Sho 63-122106).

FIG. 1 is a load-displacement curve showing one example of the results of a three-point bending test conducted on plastic magnets made respectively of (a) a plastic magnetic material of nylon 12-strontium ferrite, (b) a plastic magnetic material with addition of metal soap for better fluidity, and (c) a plastic magnetic material with addition of polyamide elastomer for providing flexibility. The three-point bending test is conducted in such a way that a plate-like sample is supported at two points on its bottom face and is destroyed with a load applied to its top face at the center between the two points. A load value measured at the breaking point is a breaking strength, where a larger breaking strength means a larger strength of the sample. And a displacement at the breaking point is a measure of flexibility, where a larger displacement means a larger flexibility of the sample.

As apparent from FIG. 1, addition of metal soap, while contributing toward increasing the fluidity of the plastic magnetic material, causes deterioration in the strength of a magnet to be made of the material. Therefore, the metal soap as a lubricant must not be added in a large amount.

Use of polyamide elastomer increases the flexibility of a magnet to be made of the material, but the polyamide elastomer has a lower flexural strength characteristic than nylon 12 and therefore reduces the strength of the plastic magnet. The use of polyamide elastomer also invites deterioration in the fluidity of the plastic magnetic material.

As a result, lubricant, while making the plastic magnetic material more fluid, invites deterioration in the strength of the plastic magnet made of the material, and polyamide elastomer, while making the plastic magnet more flexible, also invites deterioration in the strength of the magnet.

SUMMARY OF THE INVENTION

Accordingly, it is an object of the present invention to provide a plastic magnetic material which has an increased fluidity and improves flexibility of a plastic magnet to be made of the plastic magnetic material without deteriorating the strength of the plastic magnet, and which does not crack due to shrinkage and thermal shock during the manufacturing process.

In order to achieve the above object, the present inventors conducted researches and found that a polyamide plastic magnetic material consisting of magnetic powder and polyamide resin, when mixed with bis unsaturated fatty acid amide, improves the fluidity of the plastic magnetic material, and that the bisamide reacts on the polyamide resin thereby enhancing the strength and flexibility of plastic magnets made of the plastic magnetic material.

It is disclosed in Japanese Patent Laid-open No. Sho 58-158903 that organometallic compound containing an amino group and a bisamide are added to a plastic magnetic material consisting magnetic powder and nylon, thereby lowering the melting viscosity of the plastic magnetic material to improve moldability. However, the Patent published does not disclose at all that a plastic magnet made of a plastic magnetic material produced by adding a bis unsaturated fatty acid amide is excellent in flexibility, which is found for the first time by the present invention.

According to a first aspect of the present invention, there is provided a polyamide plastic magnetic material comprising: magnetic powder; a polyamide resin; and a bis unsaturated fatty acid amide which is represented by the formula below and present in an amount equal to 3 to 30 mass % of the polyamide resin:

$$R_1\text{—CONH—}R_3\text{—NHCO—}R_2$$

where $R_1$ and $R_2$ are an unsaturated hydrocarbon group having at least one double bond and $R_3$ is a hydrocarbon group, and the three components are kneaded to finalize the polyamide plastic magnetic material.

According to a second aspect of the present invention, the polyamide plastic magnetic material includes magnetic powder formed of strontium ferrite.

According to a third aspect of the present invention, the polyamide plastic magnetic material includes magnetic powder formed of barium ferrite.

According to a fourth aspect of the present invention, there is provided a polyamide plastic magnet, which is fabricated by a molding process and made of the polyamide plastic magnetic material according to any one of the first to third aspects.

According to a fifth aspect of the present invention, the molding process is insert molding.

DESCRIPTION OF THE PREFERRED EMBODIMENTS

Figure 1:
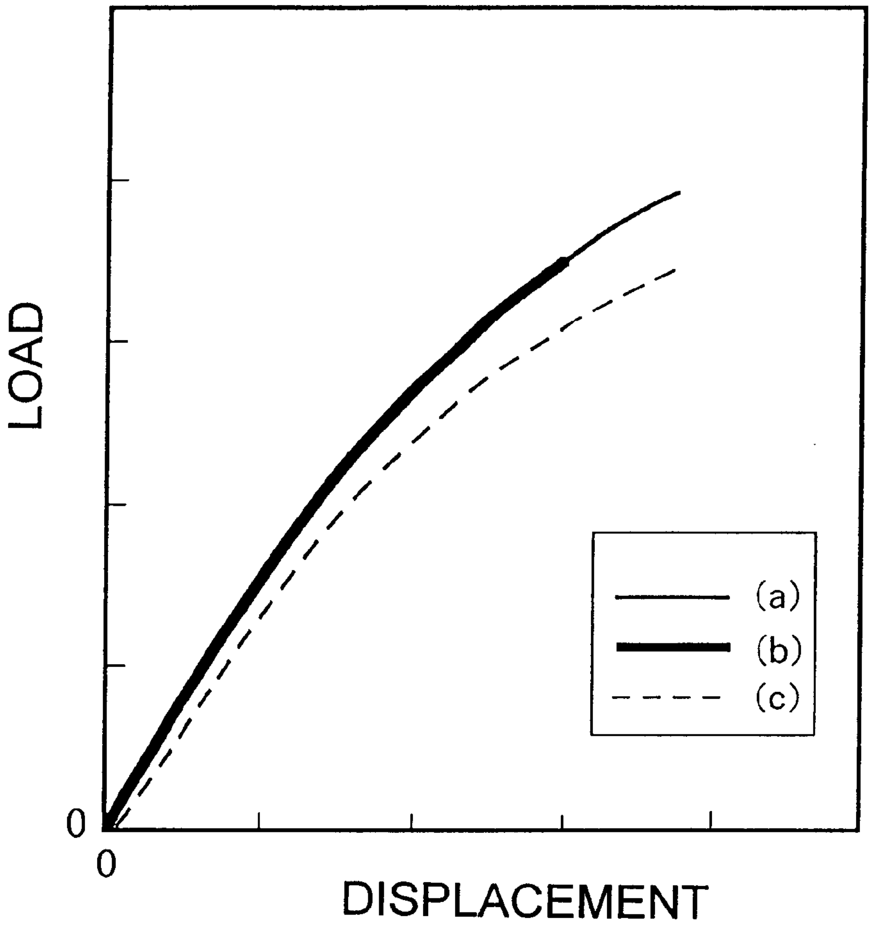
FIG. 1 is a load-displacement curve showing an example of the results of a three-point bending test conducted on plastic magnets made of (a) a plastic magnetic material, (b) a plastic magnetic material with addition of metal soap, and (c) plastic magnetic material with addition of polyamide elastomer.

Magnetic powder in a polyamide plastic magnetic material of the present invention includes, for example, powder of a ferrite hard magnetic material such as strontium ferrite, barium ferrite, lead ferrite, lanthanum cobalt strontium ferrite, and so forth, powder of a metallic hard magnetic material such as rare-earth cobalt, rare-earth iron boron, rare-earth iron nickel, and so forth, powder of a ferrite soft magnetic material such as manganese zinc ferrite, nickel zinc ferrite, and so forth, and powder of a metallic soft magnetic material such as carbonyl iron, Sendust, Permalloy, and so forth. Among them, strontium ferrite powder and barium ferrite powder are preferable.

The above-mentioned magnetic powders are usually surface-treated with a silane coupling agent, a zircoaluminate coupling agent, an aluminum coupling agent, and so forth for improving mixability with other components. Coupling agents containing amino group in molecule are preferable for a polyamide resin. Antioxidant such as hindered phenol, hindered amine, and so forth may be added as well as a coupling agent in order to prevent oxidization of resin.

The polyamide resin in the polyamide plastic magnetic material of the present invention is produced from polycondensation of diamine and dicarboxylic acid, ring-opening polymerization of lactam, or polycondensation of aminocarboxylic acid, and contains amide combinations as a recurring structural unit in molecule. A polyamide resin is divided roughly into a nylon resin which contains a great deal of aliphatic series in molecular structure and an aramid resin in which most of amide combinations are directly bonded to two aromatic rings. The nylon resin includes nylon 4, nylon 6, nylon 46, nylon 66, nylon 610, nylon 69, nylon 612, nylon 1212, nylon 11, nylon 12, nylon MDX6, nylon 6T, and so forth. And the aramid resin may be meta-aramid having amide group bonded to benzene ring in the meta position, such as polymeta-phenylene terephtalic amide, or para-aramid having amide group bonded to benzene ring in the para position, such as polypara-phenylene terephthalic amide.

The bis unsaturated fatty acid amide in the polyamide plastic magnetic material of the present invention has a structure represented in the following formula:

$$R_1—CONH—R_3—NHCO—R_2$$

where $R_1$ and $R_2$ are an unsaturated hydrocarbon group having at least one double bond. $R_1$ and $R_2$ are preferably straight-chain unsaturated fatty series group having 10 to 24 carbon atoms and 1 to 6 double bonds, and are most preferably $C_{17}H_{33}$-group. $R_3$ is a hydrocarbon group. $R_3$ is preferably methylene group, ethylene group, and propylene group, and is most preferably $—CH_2CH_2—$ group.

The bis unsaturated fatty acid amide is formed by bringing two molecules of unsaturated carboxylic acid into condensation reaction with one molecule of diamine. The unsaturated carboxylic acid includes, for example, caproleic acid, linderne acid, myristoleic acid, palmitoleic acid, petroselinic acid, petroseelaidic acid, oleic acid, elaidic acid, vaccenic acid, linoleic acid, linoelaidic acid, linolenic acid, linolenelaidic acid, α-eleostearic acid, gondoic acid, gadoleic acid, arachidonic acid, cetoliec acid, erucic acid, clupanodonic acid, and selacholeic acid. And the diamine includes methylene diamine, ethylene diamine, propylene diamine, butene diamine, pentylene diamine, hexylene diamine, and the like.

The polyamide plastic magnetic material of the present invention is obtained by kneading three components of magnetic powder surface-treated by the above mentioned lipophilic surface-treating agent, polyamide resin, and bis unsaturated fatty acid amide. The kneading work may be performed by any conventional method but can be favorably done by using a biaxial extruder. The above three components may be kneaded at the same time, or it may be such that polyamide and bis unsaturated fatty acid are kneaded together at first and then magnetic powder surface-treated is mixed therewith.

Bis unsaturated fatty acid amide is contained in the polyamide plastic magnetic material in an amount equal to 3 to 30 mass % of the polyamide resin.

It is preferable for the polyamide plastic magnetic material of the present invention to be a granular composition of a pellet with a diameter of about 2 mm and a length of about 2 mm.

The polyamide plastic magnetic material may be formed into a plastic magnet by any conventional method. Insert molding is especially favorable, which can produce plastic magnets with excellent dimensional precision at a high productivity with a low cost

EXAMPLES

The present invention will be explained in detail with reference to the following samples according to embodiments. However, it is to be understood that the present invention is by no means limited thereto but encompasses all changes and modifications that will become possible within the scope of the appended claims.

A first embodiment will hereafter be described. Invention Samples 2 to 6 and 8 to 10 were produced as follows. Silane coupling agent having amino group was added to and mixed with powder of strontium ferrite or barium ferrite of an average grain size of 1.3 μm while they were stirred using a Henschel mixer, and was dried, and magnetic powder was obtained. Nylon 12 and ethylene bis oleate amide were added to the obtained magnetic powder and mixed. The mixed powder thus obtained was kneaded with a biaxial extruder, then the kneaded powder was cooled off and cut, and a polyamide plastic magnetic material of pellet-like composition was obtained. Samples 1 and 7 in Table 1 are Comparative Samples.

Plate-like plastic magnets as evaluation samples with a width of 10 mm, a thickness of 4 mm and a length of 80 mm were made by injection molding with the obtained polyamide plastic magnetic material, and evaluated on strength and flexibility by three-point bending test. The injection time was measured under constant pressure during the injection molding with the obtained polyamide plastic magnetic material and taken as the evaluation measure of fluidity. The composition and test results on the obtained polyamide plastic magnetic material are shown in Table 1.

Comparison A. Comparative Samples 11 and 12 were produced as follows. Nylon 12 and calcium stearate as metal soap were added to magnetic powder which was obtained in the same way as for the Invention Samples of the first embodiment, and mixed. The mixed powder thus obtained was kneaded using a biaxial extruder, then the kneaded powder was cooled off and cut, and a polyamide plastic magnetic material of pellet-like composition was obtained.

biaxial extruder, then the kneaded powder was cooled off and cut, and a polyamide plastic magnetic material of pellet-like composition was obtained.

With regard to the obtained polyamide plastic magnetic material, evaluation was made on the strength and flexibility of plastic magnets made thereof and the fluidity thereof in the same way as with the Invention Samples of the first embodiment. The composition and rest results on the obtained polyamide plastic magnetic material are shown in Table 1.

TABLE 1

| Sample No. | Strontium ferrite (%) | Barium ferrite (%) | Nylon 12 (%) | Polyamide elastomer (%) | Surface treating agent (%) | Ethylene bis oleate amide (%) | Calcium stearate (%) | Ethylene bis stearate amide (%) | Breaking strength (kN) | Displacement (mm) | Fluidity (m/s) |
|---|---|---|---|---|---|---|---|---|---|---|---|
| 1 Comparative | 89 | | 11 | | 0.4 | 2 | | | 0.215 | 2.12 | 810 |
| 2 Invention | 89 | | 11 | | 0.4 | 3 | | | 0.2 | 2.86 | 520 |
| 3 Invention | 89 | | 11 | | 0.4 | 6 | | | 0.198 | 3.03 | 460 |
| 4 Invention | 89 | | 11 | | 0.4 | 8 | | | 0.197 | 3.2 | 375 |
| 5 Invention | 89 | | 11 | | 0.4 | 20 | | | 0.193 | 3.3 | 358 |
| 6 Invention | 89 | | 11 | | 0.4 | 30 | | | 0.19 | 3.29 | 353 |
| 7 Comparative | 89 | | 11 | | 0.4 | 35 | | | 0.164 | 2.55 | 350 |
| 8 Invention | 89.5 | | 10.5 | | 0.4 | 8 | | | 0.195 | 2.54 | 436 |
| 9 Invention | | 89 | 11 | | 0.4 | 8 | | | 0.2 | 2.98 | 465 |
| 10 Invention | | 89 | 11 | | 0.4 | 20 | | | 0.19 | 3.22 | 349 |
| 11 Comparative | 89 | | 11 | | 0.4 | | 1 | | 0.185 | 1.67 | 780 |
| 12 Comparative | 89 | | 11 | | 0.4 | | 3 | | 0.142 | 1.18 | 352 |
| 13 Comparative | 89.5 | | 9.4 | 1.1 | 0.6 | | 1 | | 0.197 | 2.32 | 616 |
| 14 Comparative | 89.5 | | 8.3 | 2.2 | 0.6 | | 1 | | 0.179 | 2.14 | 556 |
| 15 Comparative | 89.5 | | 10.5 | | 0.4 | | | 5 | 0.182 | 1.73 | 445 |
| 16 Comparative | 89.5 | | 10.5 | | 0.4 | | | 10 | 0.181 | 1.98 | 488 |

(A) The total of magnetic powder, nylon 12 and polyamide elastomer is defined as 100 mass %.
(B) The content of surface-treating agent is shown by mass percentage based on magnetic powder.
(C) The content of ethylene bis oleate amide, calcium stearate and ethylene bis stearate amide is show by mass percentage of the total of nylon 12 and polyamide elastomer.

With regard to the obtained polyamide plastic magnetic material, evaluation was made on the strength and flexibility of plastic magnets made thereof and on the fluidity thereof in the same way as with the Invention Samples of the first embodiment. The composition and rest results on the obtained polymiade plastic magnetic material are shown in Table 1.

Comparison B. Comparative Samples 13 and 14 were produced as follows. Nylon 12, calcium stearate as metal soap and polyamide elastomer for giving flexibility to a plastic magnet were added to magnetic powder which was obtained in the same way as for the Invention Samples of the first embodiment, and mixed. The mixed powder thus obtained was kneaded using a biaxial extruder, then the kneaded powder was cooled off and cut, and a polyamide plastic magnetic material of pellet-like composition was obtained.

With regard to the obtained polyamide plastic magnetic material, evaluation was made on the strength and flexibility of plastic magnets made thereof and the fluidity thereof in the same was as with the Invention Samples of the first embodiment. The composition and rest results on the obtained polymiade plastic magnetic material are shown in Table 1.

Comparison C. Comparative Samples 15 and 16 were produced as follows. Nylon 12 and ethylene bis stearate amide which is bis saturated fatty acid amide were added to magnetic powder which was obtained in the same way as for the Invention Samples of the first embodiment, and mixed. The mixed powder thus obtained was kneaded using a In Table 1, with the total of magnetic powder, nylon 12, and polyamide elastomer being defined as 100 mass %, the content of surface-treating agent is shown by mass percentage based on magnetic powder, and the content of ethylene bis oleate amide, calcium stearate, and ethylene bis stearate amide is shown by mass percentage based on the total of nylon 12 and polyamide elsastomer. The breaking strength is shown by load at which the samples are destroyed by the three-point bending test, and a larger value means a larger strength. The displacement is deflection amount measured when the samples are destroyed, and a larger displacement means a larger flexibility.

As understood from Table 1, the polyamide plastic magnetic material, to which ethylene bis oleate amide is added according to the present invention, produces improvement in flexibility and fluidity with almost no deterioration incurred in strength. However, when the addition of ethylene bis oleate amide is less than 3 mass %, satisfactory fluidity and flexibility are not obtained, and on the other hand when the addition is more than 30 mass %, the strength deteriorates. Therefore, the addition of ethylene bis oleate amide to polyamide should range from 3 to 30 mass %.

The addition of calcium stearate (Comparison A: Comparative Samples 11 and 12) produces improvement in fluidity but incurs significant deterioration in flexibility and strength.

The addition of polyamide elastomer as well as calcium stearate (Comparison B: Comparative Samples 13 and 14) shows improvement in flexibility but not in fluidity. Increased amount of addition of polyamide elastomer incurs deterioration in flexibility and strength.

Further, the addition of ethylene amide stearate, which is bis saturated fatty acid amide (Comparison C: Comparative Samples 15 and 16), produces improvement in fluidity but not in flexibility. Effectiveness in giving flexibility is peculiar to bis unsaturated fatty acid amide having —CH═CH— in molecule.

Analysis such as TG-DTA, FT-IR, and so forth were conducted on the plastic magnets made of the polyamide plastic magnetic material of the present invention, and it was confirmed that —CH═CH— in the bis unsaturated fatty acid amide was cleft and was brought into reaction with an end group of polyamide resin. From this, it is presumed that the improvement in flexibility of the plastic magnet, which is produced with addition of bis unsaturated fatty acid amide, is largely attributable to the reaction. And it is further presumed that the addition of bis unsaturated fatty acid amide can be effective in improving flexibility with respect to all polyamide plastic magnetic materials. If main chains $R_1$ and $R_2$ in bis unsaturated fatty acid amide represented by $R_1$—CONH—$R_3$—NHCO—$R_2$ are too short, satisfactory fluidity cannot be obtained, and on the other hand if too long, its reaction with polyamide deteriorates resulting in decreased flexibility. In this regard, oleic acid having carbon number of 17 is preferable.

Figure 2A:
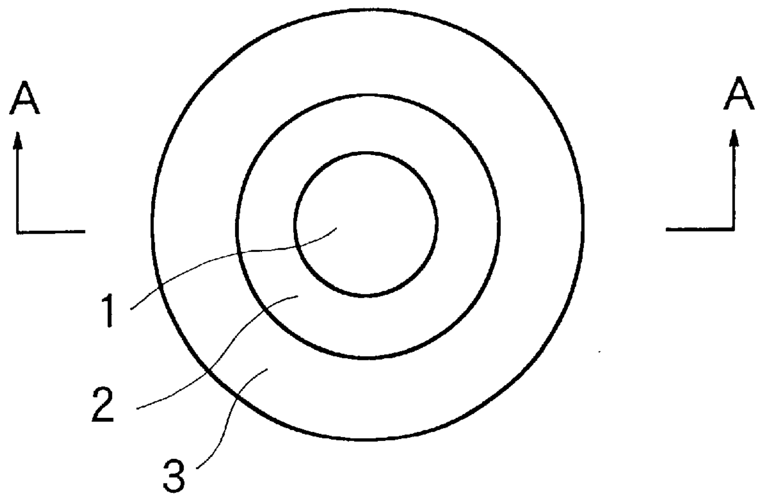
FIG. 2A is a top plan view showing a sample product produced by insert molding according to a second embodiment of the present invention.
Figure 2B:
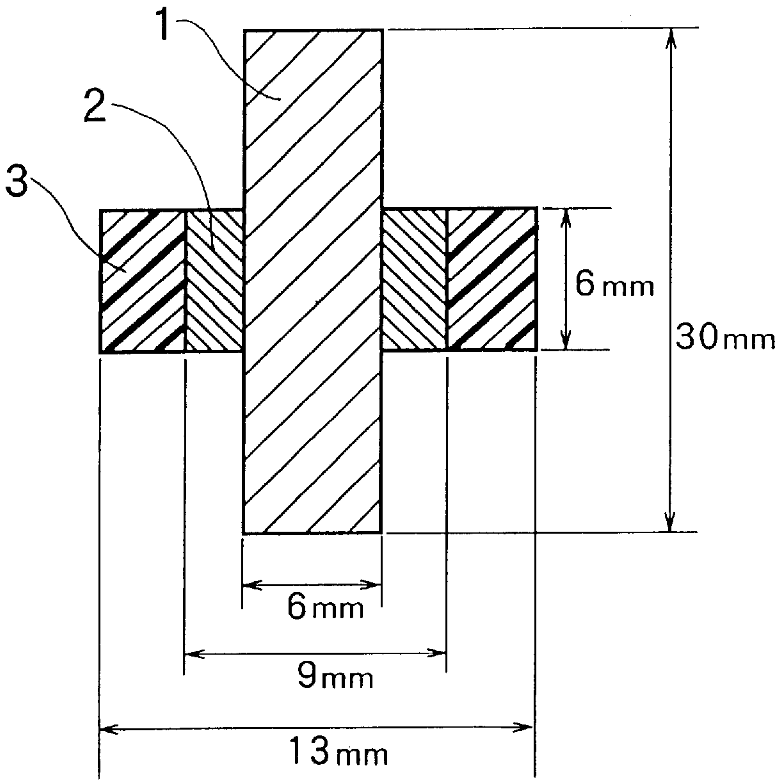
FIG. 2B is a cross section view showing the sample product of FIG. 2A taken along line A—A.

A second embodiment will hereafter be described. Sample products shown in FIGS. 2A and 2B were made by insert molding with the polyamide plastic magnetic material thus obtained. The sample products are each structured such that a core member 1, which is made of iron, and which has a diameter of 6 mm and a length of 30 mm, is inserted in a doughnut-like member, which has an outer diameter of 13 and an inner diameter of 6 mm, and which consists of an inner layer 2 made of aluminum and having a wall thickness of 1.5 mm and an outer layer 3 made of plastic magnet, having a wall thickness of 2 mm, and disposed immediately outside the inner layer 2.

The sample products were subjected to thermal shock test consisting of alternate repetition of 1 hour of −40° C. and 1 hour of 130° C. The thermal shock test was conducted for comparison purpose on sample products similarly made of the polyamide plastic magnetic material used for the Comparative Samples. The test results are shown in Table 2.

TABLE 2

| Sample | | Cracking | |
|---|---|---|---|
| No. | Moldability | After molding | Thermal shock test |
| 1 Comparative | X | No | Yes |
| 2 Invention | ○ | No | No |
| 3 Invention | ○ | No | No |
| 4 Invention | ○ | No | No |
| 5 Invention | ○ | No | No |
| 6 Invention | ○ | No | No |
| 7 Comparative | ○ | Yes | Yes |
| 8 Invention | ○ | No | No |
| 9 Invention | ○ | No | No |
| 10 Invention | ○ | No | No |
| 11 Comparative | X | No | Yes |
| 12 Comparative | ○ | Yes | Yes |
| 13 Comparative | Δ | No | Yes |
| 14 Comparative | Δ | No | Yes |

TABLE 2-continued

| Sample | | Cracking | |
|---|---|---|---|
| No. | Moldability | After molding | Thermal shock test |
| 15 Comparative | ○ | No | Yes |
| 16 Comparative | ○ | No | Yes |

Regarding moldability in Table 2, ○ indicates "excellent", Δ indicates "inferior" with an undesired pattern formed on the surface, and X indicates "defective" with a short filling. As shown in Table 2, the plastic magnets made of the polyamide plastic magnetic material according to the second embodiment of the present invention is excellent in moldability and exhibits improvement in thermal shock resistance.

The polyamide plastic magnetic material of the present invention is highly fluid and excellent in moldability. And the plastic magnets made of the polyamide plastic magnetic material of the present invention are very strong and also excellent in flexibility, and do not suffer cracking or the like due to shrinkage or thermal shock during the manufacturing process. This makes the polyamide plastic magnetic material of the present invention useful as a magnetic material for insert molding for the production of motors, and the like.

What is claimed is:

1. A polyamide plastic magnetic material comprising:

magnetic powder;

polyamide resin; and bis unsaturated fatty acid amide which is represented by a formula below and which is present in an amount equal to 3 to 30 mass % of the polyamide resin:

$R_1$—CONH—$R_3$—NHCO—$R_2$ where $R_1$ and $R_2$ are an unsaturated hydrocarbon group having at least one double bond and $R_3$ is a hydrocarbon group, the polyamide plastic magnetic material being finalized by a kneading process.

2. A polyamide plastic magnetic material according to claim 1, wherein the magnetic powder is formed of strontium ferrite.

3. A polyamide plastic magnetic material according to claim 1, wherein the magnetic powder is formed of barium ferrite.

4. A polyamide plastic magnet, which is made, by a molding process, of the polyamide plastic magnetic material according to claim 1.

5. A polyamide plastic magnet according to claim 4, wherein the molding process is insert molding.

6. A polyamide plastic magnet, which is made, by a molding process, of the polyamide plastic magnetic material according to claim 2.

7. A polyamide plastic magnet, which is made, by a molding process, of the polyamide plastic magnetic material according to claim 3.

* * * * *